(12) United States Patent
Clarke

(10) Patent No.: US 6,183,873 B1
(45) Date of Patent: Feb. 6, 2001

(54) BORON NITRIDE CATALYZED POLYSILOXANE RESIN BLEND AND COMPOSITE PRODUCTS FORMED THEREFROM

(75) Inventor: William A. Clarke, Irvine, CA (US)

(73) Assignee: The Gasket King, Irvine, CA (US)

(*) Notice: Under 35 U.S.C. 154(b), the term of this patent shall be extended for 0 days.

(21) Appl. No.: 08/962,782

(22) Filed: Nov. 3, 1997

(51) Int. Cl.$^7$ .................................................. B32B 9/04
(52) U.S. Cl. ..................... 428/447; 428/446; 524/261; 524/265; 524/477; 501/88
(58) Field of Search ................................ 524/477, 261, 524/265; 428/447, 375, 446; 501/88

Primary Examiner—Merrick Dixon
(74) Attorney, Agent, or Firm—Robert R. Meads; Anthony T. Cascio

(57) ABSTRACT

Submicron boron nitride is used as a catalyst for thermally activating polysiloxane resins when uniformly mixed with the resin either using anhydrous acetone for wet mixing or simply hot melt mixing. Boron nitride is also used to coat the fibers using a particulate sizing approach. The coated fibers are used to activate the polymer resin blend. Fabric may be impregnated with the resin to mold high temperature composite laminates from which high temperature, non-metallic gaskets may be cut.

22 Claims, 1 Drawing Sheet

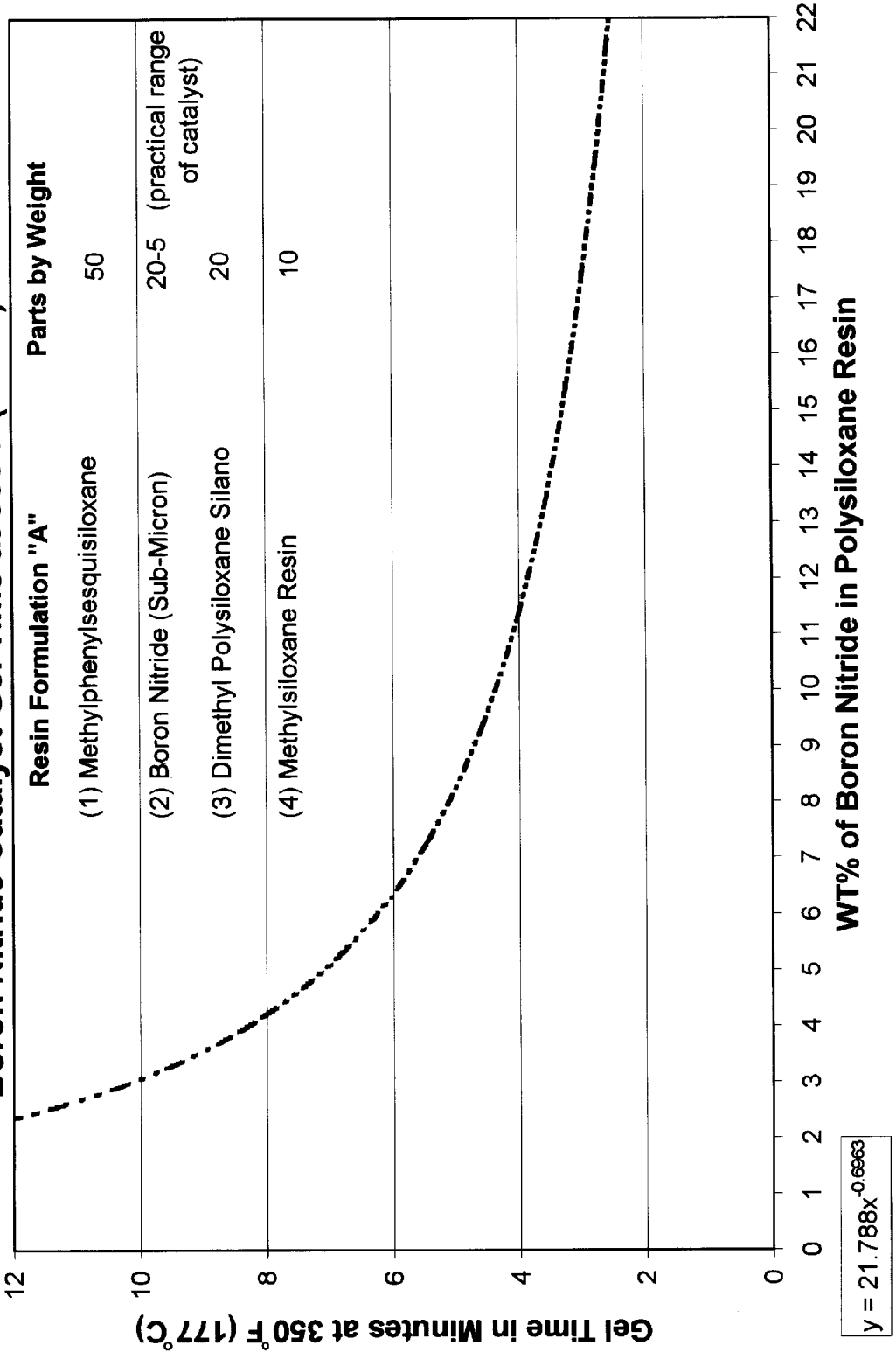

US 6,183,873 B1

BORON NITRIDE CATALYZED POLYSILOXANE RESIN BLEND AND COMPOSITE PRODUCTS FORMED THEREFROM

BACKGROUND OF THE INVENTION

1. Field of the Invention

This invention relates to the use of submicron boron nitride as the catalyst in producing a polysiloxane resin formulation and the controlled processes to provide glass fabric and filler reinforced composite gaskets from the resin formulation.

2. Description of the Previously Published Art

A variety of polysiloxane oligimers that are well known in the art (currently supplied by Dow Corning and GE Silicones and others) can be used to formulate polysiloxane resins containing catalyst and additives for composite processing. Conventional curing of polysiloxane resin formulations is well documented in the literature. See for example U.S. Pat. Nos. 4,927,587 and 5,552,466. The polysiloxane blends employ conventional means such as chemical curing or heat curing.

Typical catalysts used to crosslink silicone polymers include condensation catalysts. Depending upon the silicon polymer's reactive groups, other catalysts and initiators can also be employed. Free radical catalysts such as peroxide catalysts may be used when silicone polymers contain a vinyl group. Ultraviolet light radiation and silane-olefin addition (hydrosilation) may be used when silicone polymers have terminal double bonds or silicone hydride groups in the terminal positions. Silicone compounds with hydroxy groups can also be catalyzed with heat.

In these processes (U.S. Pat. No. 5,552,466 and *Preparative Methods of Polymer Chemistry*, W. R. Sorenson et al., John Wiley & Sons, pp. 383–390 (1961) and *Inorganic and Organometallic Polymers* "Recent Advances In Organosiloxane Copolymers", J. D. Summers et al., American Chemical Society, pp. 180–197) described for forming a resin blend of polysiloxane, there has been some mention of boron nitride as a filler in combination with the above described typical catalysts. However the method of controlling the polymerization is with conventional catalysts or heat. Most prior art has concentrated upon quartz and related ceramic additives for enhancing the ceramic yield while using conventional catalysts for controlling the polymerization process.

3. Objectives of the Invention

Boron nitride when used in combination with a conventional catalyst such as zinc hexanoic acid (U.S. Pat. No. 5,552,466), has been observed to also catalyze the reaction. This approach was observed by the inventor to become uncontrollable as the preferred submicron size of the boron nitride is employed. Essentially, the time to prepare a hot melt impregnation polysiloxane resin solution using the combination of catalysts is too short for practical "prepreg" processing and resulted in a run away reaction at the preferred concentration of the conventional catalyst. The preferred amount (U.S. Pat. No. 5,552,466) of the organozinc catalysts is 0.1 to 0.5 percent by weight of the resin blend, consequently, a further reduction in this already low level of catalyst is not desirable and more importantly, the boron nitride is preferred at higher concentrations and with submicron size for producing uniform properties. The preferred boron nitride properties are high temperature lubrication of glass fibers which enhance the high temperature strength and thermal conductivity of glass fabric reinforced high temperature non-metallic composite gaskets.

It is the objective of this invention to allow polysiloxane polymer blends to be processed with submicron boron nitride particulate as the controlling catalyst without the additional use of conventional catalysts. The boron nitride submicron particulate is inherently porous, consequently its surface area is significantly greater than non-porous submicron particles. Also, the weight ratio of resin to (submicron) boron nitride is most practical between a 5 to 1 and 20 to 1 range. This weight range allows the preferred polysiloxane blend to be controlled within practical "gel" (gelation) time at 350° F. (177° C.) limits of 2 minutes to 10 minutes when processed. The gel time for boron nitride (taken at different concentrations of the catalyst) is shown in FIG. 1 for a preferred polysiloxane formulation. The gel can be observed precisely as the time when the polymerizing mixture suddenly loses fluidity while constantly stirring at 350° F. (177° C.), e.g., when bubbles no longer rise in it.

It is the further objective of this invention to provide a practical method of processing the preferred polysiloxane resin blend into hot melt impregnation blends with a high quality uniform dispersion of the submicron boron nitride catalyst. Submicron boron nitride tends to "clump" together when added to polysiloxane blends which results in "streaking" during "prepreg" processing. This condition also renders the boron nitride not practical as an effective controlling catalyst because it diminishes the available surface area. The preferred processing approach is to disperse the submicron boron nitride into the preferred polysiloxane blend using anhydrous acetone to facilitate an even distribution with minimal to no submicron clumping observed. The use of anhydrous acetone allows the ease of acetone removal and thoroughly dissolves all polysiloxane blend constituents without leaving water contamination.

It is the further objective of this invention to produce a variety of high temperature non-metallic composite gaskets. The gaskets are cut from flat composite laminates molded from various ceramic fabrics and fiber reinforcements with a preferred S-glass, 8HS, style 6781 fabric and impregnated with the preferred polysiloxane formulation loaded with boron nitride and quartz filler. The preferred prepreg produced from hot melt processing is catalyzed with boron nitride within the concentration range given in FIG. 1. This invention allows optimal control of submicron boron nitride loaded polysiloxane resin blends for hot melt prepreg processing.

SUMMARY OF THE INVENTION

A unique blend of resins and additives has been formulated which will produce highly reliable polysiloxane resin for hot melt or wet impregnation of ceramic reinforcements. The catalyst used throughout is submicron boron nitride which is blended within the preferred polysiloxane blend with anhydrous acetone. The catalyst can also be blended with high speed mixing equipment without the use of acetone, but for preferred uniform dispersion and low temperature processing assurance, the anhydrous acetone is preferred. Other fillers include mica, quartz, silicon hexaboride, silicon carbide, and related whisker materials including carbon whiskers. The preferred fabric is 8 HS, S-glass, style 6781 fabric. Other fabrics and fibers are E-glass, alumina-silica, alumina, fused silica and zirconia.

The resins are blended together utilizing boron nitride as the catalyst and then, the resin blend is used to impregnate ceramic fabric from preferably a hot melt process at a temperature not to exceed 200° F. (93° C.). A wet process in acetone can also be utilized, but the hot melt process is preferred. Using anhydrous acetone minimizes the amount of acetone required and assures a uniform boron nitride dispersion. The anhydrous acetone is easily removed in preparing the polysiloxane blend for hot melt processing.

The resin impregnated fabric is molded into flat laminates which are heat processed at pressures from 100 to 200-psi at a temperature of 400° F. (204° C.) utilizing autoclaves and presses for high volume production. The laminates are cut into various high temperature gaskets. The boron nitride catalyzed polysiloxane matrix produces high temperature non-metallic gaskets capable of sealing hot gases at temperatures of 1832° F. (1000° C.). The high temperature gasket made from the boron nitride catalyzed resin and reinforced with S-glass fabric has been tested in a Ford Ranger truck 2.3 liter 4 cylinder engine head gasket. The molded non-metallic high temperature composite gasket material has been tested in a Ford Ranger Truck engine. After the gasket was installed, the gasket was found to successfully seal hot combustion chamber gases at 500-psi and 1000° F. (537° C.), motor oil at 72-psi and water coolant for over 5000 miles of city and highway driving with no sealing problems and 50 to 60 percent reduction in oxides of nitrogen combustion emissions compared to the standard metallic head gasket.

BRIEF DESCRIPTION OF DRAWING

FIG. 1 is a graph depicting the gel times in minutes as a function of the weight percentage of boron nitride in the polysiloxane resin according to the present invention.

DESCRIPTION OF THE PREFERRED EMBODIMENTS

The unique resin employed is blended from three different molecular weight silicone resins. The primary component is a solid resin such as methylphenylsesquisiloxane which is dissolved into preferably two lower molecular weight liquid resins. One is dimethyl polisiloxane silanol and the other is a methylsiloxane resin. To facilitate the thorough mixing of the resin blend, a solvent such as acetone may be added to initially dissolve the methylphenlsesquisiloxane.

A typical resin blend with a preferred additive system is given in table 1.

TABLE 1

| Resin/Additive Formulation | | Parts by Weight | |
|---|---|---|---|
| | | In General | Preferred |
| (1) | Methylphenylsesquisiloxane | 50 | 50 |
| (2) | boron nitride catalyst and other filler such as | 5–20 | 20 |
| | quartz, | 20–5 | 5 |
| | mica or | 20–5 | |
| | silicon hexaboride | 5 | |
| (3) | Dimethylpolysiloxane silanol | 10–50 | 20* |
| (4) | Methylsiloxane resin | 5–50 | 10 |

In Table 2, the formulation using preferred commercially available resins is set forth.

TABLE 2

| Formulation Using Commercial Resins | | Parts by Weight | |
|---|---|---|---|
| | | In General | Preferred |
| (1) | GE Silicones SR 355 silicone resin (high MW) | 20 | 50 |
| (2) | boron nitride catalyst and other filler such as | 5–20 | 20 |
| | quartz, | 20–5 | |
| | mica, or | 20–5 | |
| | silicon hexaboride | 5 | |
| (3) | GE Silicones TPR 178 | 10–50 | 20 |
| (4) | GE Silicones TPR 179 | 5–50 | 10 |

The boron nitride catalyst is added at a parts by weight level of about 20 for the above resin formulation based on 50 parts by weight of the solid resin. Alternatively, Dow Corning materials can be used for some of the equivalent GE silicone resins.

The range of products obtained is directly related to the cure temperature as set forth in Table 3.

TABLE 3

| Products Obtained | Cure Temperature |
|---|---|
| Rubber products | 300–400° F. |
| High vacuum sealing products | 400–500° F. |
| High mechanical strength products | 500–750° F. |
| Green ceramic products | 800–1250° F. |
| Hard ceramic products | 1250–2350° F. |

These resin formulations are most effective when used to impregnate refractory fibers such as S-glass, E-glass, quartz, silica, alumina, and alumina-silica fibers, fabrics or braided preforming materials.

According to Owens Corning, there are two grades of glass fiber used in the composites industry, E-glass or electrical grade and Owens Corning's patented S-2 Glass® high-strength fiber. S2-Glass® fiber is said to provide higher strength and corrosion resistance than E-glass and is used in more demanding applications which require added strength, lighter weight or both. Both E-glass and S-2 Glass® fiber compete against exotic fibers like aramid, carbon and boron. Due to cost performance advantages, Owens Corning claims that 99% of all fibers used within the composites industry are glass fibers.

When these refractory fibers are used with this polymer blend to produce fiber reinforced composites the parts produced have superior mechanical gasket sealing, thermal conductivity, dielectric and reduced friction properties.

The following Table 4 provides typical combinations of the resin blend for specific fibers and molded composite performance temperatures.

TABLE 4

Silica Fiber Reinforced Composite Primary Structure Materials for Different Temperatures

| Performance ° F. | Temperature (° C.) | Fiber Type | Fiber Sizing | Matrix | Matrix Fillers |
|---|---|---|---|---|---|
| <500 | (260) | silica (E-glass) | Silane | Polysiloxane | quartz\boron nitride |
|  |  | silica (S2-glass) | Silane | Polysiloxane | quartz\boron nitride |
| 900 to 1200 | (482 to 649) | silica (S2-glass) | Silane | Polysiloxane | quartz\boron nitride |
|  |  | quartz | Silane | Polysiloxane | quartz\boron nitride |
| 1500 to 1800 | (816 to 982) | silica (S2-glass) | BN* | Polysiloxane | quartz\boron nitride |
|  |  | quartz... | BN* | Polysiloxane | quartz\boron nitride |
|  |  | alumina-silica | BN* | Polysiloxane | quartz\boron nitride |
| 1800 to 2000 | (982 to 1093) | quartz... | BN* | Polysiloxane | quartz\boron nitride |
|  |  | alumina-silica | BN* | Polysiloxane | quartz\boron nitride |
|  |  | alumina | BN* | Polysiloxane | quartz\boron nitride |

*Note: The fiber sizing coating was <1% of the fiber weight and the coating was a low mw polysiloxane with 10 wt % boron nitride For the various fiber to matrix additive relationships set forth in Table 4 it is seen that for all of the high temperature ceramic temperature products, BN is the specified fiber coating to assure highest performance.

The boron nitride, BN is best employed in particles sizes of 1 micron or less. This BN is available from CERAC, Inc. their item #B-1084.

TABLE 5

BN Resin Formulation

| Resin formulation |  | Parts by Weight |
|---|---|---|
| (1) | Methylphenylsesquisiloxane | 50 |
| (2) | boron nitride (98% submicron) | 20 |
| (3) | Quartz (submicron) | 5 |
| (4) | Dimethyl polysiloxane silanol | 20* |
| (5) | Methylsiloxane resin | 10 |

*Approximate amount since commercial formulation will have other ingredients

When the fiber reinforced composite which is molded from the resin set forth in Table 5, is heated to high temperatures to produce ceramic products, one of the key features of this invention is to use a slow controlled heat schedule. An example of such a schedule is as follows.

After two hours under 200-psi pressure and 350° F. (177° C.), a typical ⅛-inch thick fiber reinforced molded panel is heat-treated at the following heat schedule for optimal ceramic performance properties:

Heat from 350° F. (177° C.) to about 960° F. (515° C.) at about 212° F. (100° C.)/hour.

Then hold at about 960° F. for about 48 hours.

Then raise from 960° F. to 2000° F. (1093° C.) at about 50° F. (10° C.)/hour.

Then hold for about 2 hours.

Then raise from about 2000° F. (1093° C.) to about 2300° F. (1260° C.).

Then hold for about 2 hours at about 2300° F. (1260° C.).

Then cool at not more than about 212° F./hour.

A variety of polysiloxane oligomers that are well known in the art, such as those commercially available from Dow Corning, General Electric and others, can be used to formulate the polysiloxane resin containing the boron nitride and impregnating the ceramic fibers or fabric for composite molding and ceramic processing. The silicon matrix used in this invention is essentially an elastomer when heat treated to 350° F. (177° C.), a thermoset to 700° F. (371° C.), a green ceramic to 1300° F. (704° C.) and a ceramic to 2300° F. (1260° C.).

As a result, its properties fall between those of elastomers and ceramics depending upon the temperature to which the composite is heat treated. The formulation is adjusted to provide fiber impregnation and composite molding advantages. The storage life as ambient temperature for the resin has been found to be for weeks with no apparent processing problem. The polymer reaction is so slow at ambient temperatures as to provide a very practical "out time" level until it is released at the appropriate processing cure temperature.

The initial reaction in the heat cure of the resin formulation initially involves condensation of methoxysilane and silanol end groups. This condensation reaction has a methanol by-product followed by a cross-linking polymerization reaction as the temperature is raised from 300° F. (149° C.) to 550° F. (288° C.). The cross-linking at the higher temperatures forms a dense thermoset polymer network with the evolution of formaldehyde and methanol followed by decomposition of the polysiloxane matrix from 802° F. (428° C.) to 1050° F. (564° C.). The methylsiloxane component decomposes evolving methane in the 937° F. (503° C.) to 1220° F. (660° C.) range.

The polysiloxane polymers can be created from many polymer combinations. One family of polysiloxane formulations are called "rigid" silicone resins which are prepared from cohydrolyzed organochlorosilane mixtures containing high functionality in desired ratios to form resin intermediates high in reactive silanol groups. The resin intermediate is subsequently partially condensed to form a complex polysiloxane polymer.

The prepolymer is still solvent-soluble and in a usable form. In the presence of heat and/or catalyst, the remaining silanol groups of the prepolymer condense further to fully cure the resin. The by-product of the cure is a small amount of water and methanol from condensed -oH groups. Resins of this type may vary widely in physical form and handling characteristics, depending on the choice of the predominately methyl and phenyl radicals. Appropriate polysiloxane polymers are well known in the art from which appropriate members are chosen to provide a blend having these characteristics. The rigid polysiloxane polymer is both chain extended, branched and may also be cross-linked.

Boron nitride has been found to perform well as a thermal-activated catalyst. FIG. 1 provides the gel times which are comparable for typical curing agents, such as the peroxide or metallic hexanoate and aliphatic hexanoic acid catalysts.

The invention provides the opportunity for producing superior ceramic filled matrix composite parts for such parts as industrial gaskets (including internal combustion engines, chemical pumps, etc.), valves, pistons, push rods, engine blocks and heads, seal rings, turbine engine combustion liners and blades and composite industry autoclave tooling, press tooling, glass industry mold forming tooling and high temperature fasteners, and super plastic forming tools.

The mechanism for the superior parts to be produced is directly related to the preferred use of boron nitride as the catalyst for the polysiloxane polymerization. This is achieved in two ways.

The first method utilizes the boron nitride at less than 1 micron particulate size, with a concentration from 5/1 to 20/1 by weight ratio of resin blend wt to boron nitride which is most desired for controlling the impregnation hot melt process at less than 200° F. (93° C.) with sufficient process time for long prepreg processing runs. FIG. 1 reveals the gel times which have been found to consistently produce the same polymerization of polysiloxane as conventional catalysts with excellent control of the reaction when using submicron boron nitride.

The second method uses anhydrous acetone to uniformly disperse the submicron boron nitride throughout the polymer blend without "clumping" and allows a ease of removal of the acetone with minimal use of the solvent. The boron nitride lubricates the interface between the fiber and matrix increasing the load bearing capability of the composite systems so that the higher mechanical properties can be realized for parts requiring high temperature performance conditions such as internal combustion engine non-metallic composite head gaskets. It is understood that the foregoing detailed description is given merely by way of illustration and that many variations may be made therein without departing from the spirit of this invention.

The following Table 6 reveals initial test results after processing composite rods made with only 5 and 10% boron nitride at 900° F. and 1500° F., showing increased tensile strengths using different ceramic fiber reinforcements.

TABLE 6

Tensile Test Results for Ceramic matrix Composite Rods

| Fiber Type | Fiber - Filler Volume % | Fiber Coating | Matrix Filler (% of fiber wt.) | Cure ° F. | Temp. (° C.) | Avg. Tensile Strength (Ksi) | Max. Ind. Strength (Ksi) |
|---|---|---|---|---|---|---|---|
| S2(silica) | 52 | PVA | No filler | 900 | (482) | 2.3 | 2.3 |
| S2(silica) | 55 | PVA | 10% quartz | 900 | (482) | — | 2.6 |
| S2(silica) | — | <1% BN | 10% BN | 900 | (482) | 3.8 | 4.0 |
| S2(silica) | 61 | PVA | No filler | 1500 | (816) | — | 2.6 |
| S2(silica) | 45–50 | <1% BN | 10% BN | 1500 | (816) | 3.0 | 3.2 |

Test rods containing filler materials e.g., quartz and boron nitride showed higher strength test results when compared to unfilled materials processed the same way. The S2 fiber reinforced rods demonstrated the best results particularly when used with boron nitride. At 900° F. (482° C.) the boron nitride loaded S2 glass rod with 3.8 Ksi tensile strength had 65% higher strength than the comparable unfilled material with only 2.3 Ksi tensile strength. Similarly, at 1500° F. (816° C.) the boron nitride loaded S2 glass reinforced rod with a 3.0 Ksi tensile strength had 15% higher strength than the comparable unfilled rod with only a 2.68 Ksi tensile strength.

By using the formulations and the slow heating cycles of this invention, component parts can be processed to 1500° F. (816° C.) so as to provide total removal of residual organic by-products and parts made in this manner should produce more reliable performing CMC valve products.

It is understood that the foregoing detailed description is given merely by way of illustration and that many variations may be made therein without departing from the spirit of the invention.

What is claimed:

1. A polysiloxane resin blend comprising:
    a solid silicone resin;
    a liquid siloxane resin;
    submicron boron nitride as a catalyst in a resin to catalyst weight ratio of about 20/1 to about 5/1; and
    a submicron refractory filler.

2. The blend of claim 1 wherein the solid silicon resin is methylphenylsesquisiloxane.

3. The blend of claim 2, wherein the liquid siloxane resin is selected from a group consisting of dimethyl polysiloxane silanol, methylsiloxane resin and mixtures thereof.

4. The blend of claim 3, wherein the refractory filler is selected for a group consisting of boron nitride, mica, quartz, silicon hexaboride, alumina and carbon whiskers and mixtures thereof.

5. The blend of claim 3 comprising in approximate parts by weight,
    (1) methylphenylsesquisiloxane 50,
    (2) refractory additive 5–20,
    (3) dimethyl polysiloxane silanol 10–50,
    (4) methylsiloxane resin 5–50, and
    (5) catalyst submicron boron nitride 5–20.

6. The blend of claim 5 comprising in approximate parts by weight,
    (1) methylphenylsesquisiloxane 50,
    (2) refractory additive 5,
    (3) dimethyl polysiloxane silanol about 20,
    (4) methylsiloxane resin 10, and
    (5) catalyst submicron boron nitride 20.

7. The blend of claim 1 prepared by:
    (1) mixing and melting the solid resin into the liquid resin at a temperature of about 150 to 200° F.;

(2) blending the boron nitride into the melt of step (1); and (3) blending the refractory filler into the blend of step (2) until the boron nitride catalyst is thoroughly mixed in the blend and the resulting blend is ready for impregnation into glass or ceramic fabric or fiber to form a moldable "prepreg" material.

8. The blend of claim 1 prepared by:

(1) dissolving the solid resin in the liquid and an anhydrous acetone;

(2) mixing the submicron boron nitride as a dry and porous powder into the mixture of step (1);

(3) mixing the submicron refractory filler into the mixture of step (2) using anhydrous acetone;

(4) removing the anhydrous acetone; and (5) melting the mixture of step (4) at about 150 to 100° F.

9. A composite product comprising the blend of claim 8 impregnating a ceramic fabric or refractory fiber reinforcement at a weight ratio of about 75–65 parts reinforcement to about 30–35 parts resin blend.

10. The composite product of claim 9 wherein the resin blend is heated to between 150 and 200° F. and impregnated into the reinforcement.

11. The composite product according to claim 10, wherein the impregnated refractory fibers are formed into a desired product configuration and the heating is applied while the impregnated fibers are in the shape.

12. The composite according to claim 9 wherein following impregnation of a ceramic fabric or refractory reinforcement with the resin blend the product is initially heated at about 350° F. (177° C.) and then post cured at the following temperatures to obtain the indicated product:

| Products Obtained | Cure Temperatures |
|---|---|
| Rubber products | 300–400° F.(149–204° C.) |
| High vacuum sealing products | 400–500° F.(204–260° C.) |
| High mechanical strength products | 500–750° F.(290–399° C.) |
| Green ceramic products | 800–1250° F.(427–677° C.) |
| Hard ceramic products | 1250–2350° F.(677–1288° C.) |

13. The composite product according to claim 9, wherein the refractory fibers are S-glass, E-glass, quartz, silica, alumina, alumina-silica, carbon or silicon carbide or nylon fibers.

14. A composite ceramic product according to claim 9 wherein after impregnation of the resin blend into a ceramic fabric the impregnated fabric is subjected to a controlled heating schedule comprising the steps of (1) initial heating at about 350° F. (177° C.) for about 2 hours, (2) slowly heating to about 960° F. (516° C.), (3) holding at about 960° F. (516° C.) for about 48 hours, (4) slowly heating to about 2000° F. (1093° C.), (5) holding at about 2000° F. (1093° C.) for about 2 hours, (6) heating to about 2300° F. (1260° C.), (7) holding at about 2300° F. (1260° C.) for about 2 hours, and (8) cooling at not more than about 212° F. (100° C.)/hour.

15. The composite product according to claim 14, wherein the initial heating step (1) is done under about 200-psi pressure.

16. The composite product according to claim 14 wherein the slow heating in step (2) is done at about 212° F. (100° C.)/hour.

17. The composite product of claim 14 wherein the slow heating in step (4) is done at about 50° F. (10° C.)/hour.

18. The composite product according to claim 9 wherein the refractory fibers prior to impregnation with the resin blend are in the form of a glass cloth.

19. A process for making a fiber reinforced silica matrix composite product containing refractory fibers which is substantially free of black glass comprising the steps of:

(a) applying to refractory fibers a lubricating agent of submicron boron nitride particles and a polysiloxane resin composition by either:

(A) a two step process of (1) coating the refractory fibers directly with boron nitride in the form of a thin polysiloxane resin coating which is at less than about 1% of the fiber weight and which contains about 5 to 10% by weight of submicron size boron nitride particles; and (2) impregnating the coated fibers with a basic polysiloxane resin composition comprising (i) a substantial amount of a solid silicone resin dissolved in at least one lower molecular weight liquid siloxane resin;

(ii) a refractory additive; and (iii) a curing agent; or (B) a single step process of impregnating the refractory fibers with a basic polysiloxane resin composition which further contains a lubricating agent comprising:

a substantial amount of a solid silicone resin dissolved in at least one lower molecular weight liquid siloxane resin;

(ii) a refractory additive; and (iii) a curing agent; and said basic polysiloxane resin composition further containing (iv) a lubricating agent comprising boron nitride particles with a particle size of about 1 micron or less so that the fiber is lubricated with the boron nitride particles as the fiber is lubricated with the boron nitride particles as the fiber is loaded with the resin; and (b) heating the resulting mixture from (A) or (B) under a slow controlled heating schedule so as to minimize the formation of black glass.

20. A process according to claim 19 wherein the basic polysiloxane resin composition comprises in parts by weight about:

(1) methylphenylsesquisiloxane
50, (2) refractory additive
30, (3) dimethyl polysiloxane silanol
10–50, (4) methylsiloxane resin
5–50, and (5) catalyst submicron boron nitride
20.

21. A process according to claim 20, wherein the methylphenylsesquisiloxane is GE Silicones SR 355, the dimethyl polysiloxane silanol is GE silicones TPR 178, and the methylsiloxane resin is GE Silicones TPR 179.

22. A process according to claim 21, wherein the controlled heating schedule comprises the steps of:

(1) initial heating at about 350° F. (177° C.) for about 2 hours;

(2) slowly heating to about 960° F. (516° C.);

(3) holding at about 960° F. (516° C.) for about 48 hours;

(4) slowly heating to 2000° F. (1093° C.);

(5) holding at about 2000° F. (1093° C.) for about 2 hours;

(6) heating to about 2300° F. (1260° C.);

(7) holding at about 2300° F. (1260° C.) for about 2 hours; and (8) cooling at not more than 212° F. (100° C.)/hour wherein a composite ceramic product is produced and the amount of black glass produced is minimized.

| Products Obtained | Cure Temperatures |
|---|---|
| Rubber products | 300–400° F.(149–204° C.) |
| High vacuum sealing products | 400–500° F.(204–260° C.) |
| High mechanical strength products | 500–750° F.(290–399° C.) |
| Green ceramic products | 800–1250° F.(427–677° C.) |
| Hard ceramic products | 1250–2350° F.(677–1288° C.) |

* * * * *